US011657606B2

(12) United States Patent
Hofman et al.

(10) Patent No.: US 11,657,606 B2
(45) Date of Patent: May 23, 2023

(54) DYNAMIC IMAGE CAPTURE AND PROCESSING

(71) Applicant: Hi-Tech Solutions Ltd., Yokneam (IL)

(72) Inventors: Yoram Hofman, Kefar Bialik (IL); Igal Dvir, Ra'anana (IL)

(73) Assignee: OMNIQ Corp., Salt Lake City, UT (US)

( * ) Notice: Subject to any disclaimer, the term of this patent is extended or adjusted under 35 U.S.C. 154(b) by 0 days.

(21) Appl. No.: 14/178,291

(22) Filed: Feb. 12, 2014

(65) Prior Publication Data

US 2014/0160283 A1    Jun. 12, 2014

Related U.S. Application Data

(63) Continuation-in-part of application No. 13/049,148, filed on Mar. 16, 2011, now Pat. No. 8,704,889.

(60) Provisional application No. 61/314,440, filed on Mar. 16, 2010.

(51) Int. Cl.
  *G06V 10/147*   (2022.01)
  *G06V 10/96*    (2022.01)
  *G06V 20/62*    (2022.01)

(52) U.S. Cl.
  CPC ............ *G06V 10/147* (2022.01); *G06V 10/96* (2022.01); *G06V 20/625* (2022.01); *G06V 2201/08* (2022.01)

(58) Field of Classification Search
  CPC ........... G06K 2209/15; G06K 9/00711; G06K 9/209; B60Q 1/525; B60Q 5/006; G05D 1/0246; H04N 7/18; H04N 7/181; H04N 7/183; H04N 7/186; H04N 7/188; G06T 7/20; G08B 13/2402
  USPC .................................................. 348/143, 118
  See application file for complete search history.

(56) References Cited

U.S. PATENT DOCUMENTS

| | | | | |
|---|---|---|---|---|
| 6,429,893 B1 * | 8/2002 | Xin | ................. | G08B 13/19632 |
| | | | | 348/155 |
| 6,754,369 B1 * | 6/2004 | Sazawa | ........................ | 382/105 |
| 7,130,383 B2 * | 10/2006 | Naidoo | ............... | G08B 25/008 |
| | | | | 379/37 |
| 7,504,965 B1 * | 3/2009 | Windover et al. | ............ | 340/937 |
| 8,243,140 B1 * | 8/2012 | Howe | ............................ | 348/149 |
| 2002/0070914 A1 * | 6/2002 | Bruning | ................. | H05B 45/28 |
| | | | | 345/102 |
| 2004/0113568 A1 * | 6/2004 | Dowling | ............ | G01N 21/8806 |
| | | | | 315/291 |
| 2004/0218052 A1 * | 11/2004 | DiDomenico et al. | .. | 348/207.99 |

(Continued)

*Primary Examiner* — Christopher S Kelley
*Assistant Examiner* — Ana Picon-Feliciano
(74) *Attorney, Agent, or Firm* — Bochner IP, PLLC; Ariel Reinitz (57) ABSTRACT

Systems and methods are disclosed for dynamic image capture and processing. In one implementation, a processing device receives a first video stream, the first video stream being captured via an optical sensor configured with a first set of capture parameters. The processing device processes the first video stream with a first set of processing parameters. The processing device receives a second video stream, the second video stream being captured via the optical sensor configured with a second set of capture parameters. The processing device processes the second video stream with a second set of processing parameters. The processing device provides an output based on at least one of (a) the first video stream, as processed, or (b) the second video stream, as processed.

20 Claims, 4 Drawing Sheets

(56) References Cited

U.S. PATENT DOCUMENTS

| | | | |
|---|---|---|---|
| 2006/0269105 A1* | 11/2006 | Langlinais | 382/105 |
| 2007/0133844 A1* | 6/2007 | Waehner | G06K 9/2036 |
| | | | 382/118 |
| 2008/0166018 A1* | 7/2008 | Li | G06K 9/00805 |
| | | | 382/105 |
| 2008/0212837 A1* | 9/2008 | Matsumoto et al. | 382/105 |
| 2009/0207046 A1* | 8/2009 | Arrighetti | G06K 9/3258 |
| | | | 340/937 |
| 2009/0219387 A1* | 9/2009 | Marman | G08B 13/19652 |
| | | | 348/143 |
| 2009/0262189 A1* | 10/2009 | Marman | G08B 13/19613 |
| | | | 348/143 |
| 2010/0039511 A1* | 2/2010 | Wang | H04N 7/186 |
| | | | 348/143 |
| 2010/0118146 A1* | 5/2010 | Schofield | B60R 1/00 |
| | | | 348/148 |
| 2010/0205667 A1* | 8/2010 | Anderson | G06F 21/62 |
| | | | 726/19 |
| 2010/0315247 A1* | 12/2010 | Tseng | G08B 13/19695 |
| | | | 340/628 |
| 2011/0063446 A1* | 3/2011 | McMordie | G06K 9/00255 |
| | | | 348/159 |
| 2011/0234829 A1* | 9/2011 | Gagvani | H04N 5/232 |
| | | | 348/222.1 |
| 2012/0002045 A1* | 1/2012 | Tony | G06K 9/209 |
| | | | 348/143 |
| 2012/0130258 A1* | 5/2012 | Taylor | A61B 3/18 |
| | | | 600/476 |
| 2014/0132758 A1* | 5/2014 | Saptharishi | H04N 7/18 |
| | | | 348/135 |

\* cited by examiner

DYNAMIC IMAGE CAPTURE AND PROCESSING

CROSS-REFERENCE TO RELATED APPLICATIONS

This application is a continuation-in-part of U.S. patent application Ser. No. 13/049,148, filed Mar. 16, 2011, which claims the benefit of U.S. patent application Ser. No. 61/314,440 filed on Mar. 16, 2010, each of which is hereby incorporated by reference in its respective entirety.

TECHNICAL FIELD

Aspects and implementations of the present disclosure relate to data processing, and more specifically, to dynamic image capture and processing.

BACKGROUND

Images and/or videos can be captured and/or processed with respect to various parameters, however such parameters, though perhaps satisfactory for one purpose, may be inadequate for another purpose.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a first video stream, the first video stream being captured via an optical sensor configured with a first set of capture parameters. The processing device processes the first video stream with a first set of processing parameters. The processing device receives a second video stream, the second video stream being captured via the optical sensor configured with a second set of capture parameters. The processing device processes the second video stream with a second set of processing parameters. The processing device provides an output based on at least one of (a) the first video stream, as processed, or (b) the second video stream, as processed.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

License Plate Recognition (LPR), also known as Automatic Number Plate Recognition (ANPR), is a technique for identifying a vehicle registration string such as on a license plate. Various imaging systems used for LPR utilize camera(s) to capture one or more images of the front and/or rear license plates of a vehicle. Such license plates can include alphanumeric characters and/or other signs, which can make up the reference registration string which can be used for vehicle identification. In order to facilitate the identification/recognition of the characters, registration string, etc., on the license plate, it may be advantageous to increase the contrast present between the characters/strings and the background upon which they appear. Accordingly, various LPR systems employ illumination units, such as those that provide constant lighting and/or pulsed illumination.

Alphanumeric characters can be scanned and processed via various Optical Character Recognition (OCR) processes, such as those described, e.g., in U.S. Pat. No. 8,320,629, the entirety of which is incorporated herein by reference. Such OCR processes can, for example, enable identification of characters/strings while performing and calibrating data verification to ensure data reliability, even in adverse conditions, such as by adjusting and correcting unclear characters and their images.

Many LPR systems require a high level of accuracy as well as reports on the confidence of the results. Errors in the recognition process may cause undesired consequences, such as billing wrong drivers (e.g., in toll roads), launching security forces due to wrong recognition of a vehicle (e.g., in security systems), preventing access from an authorized vehicle (e.g., in gates), and so on. Therefore it is advantageous to employ techniques that increase the accuracy of the detection of license plate characters and prevent recognition errors.

The success of an LPR process can be characterized, for example, based on a number of parameters and factors, constituting "affecting parameters," such as internal factors, plate complexity, external factors, plate make and condition. The referenced internal factors can include, e.g., the quality of the LPR program, the resolution and quality of the camera, the quality and type of illumination, the field of view, etc. Plate complexity can include, for example, the possible combinations of alphanumeric characters/strings, presence of graphics and special symbols, the use of multiple rows or staggered letters, use of abnormal font types, use of colors, etc. External factors can include parameters such as environmental parameters (indicative, for example, of the sun's intensity and radiation, glare, rain, fog, etc.) and parameters relating to the vehicle (such as the speed of the vehicle, etc.). The condition of the plate can be affected, e.g., by obscuring elements such as vehicle hooks, license frames, screws and dents. The plate make depends, for example, on the quality of the paint, whether the plate is retro-reflective or reflective, the contrast and colors of the alphanumeric characters and their background.

Contrast enhancement during an OCR process, segmentation of the alphanumeric characters (e.g., detecting each character's relative and/or absolute position) and identification of each character are performed. During these operations the contrast of the characters (e.g., in relation to their background) can be an important factor which can facilitate/assist in differentiating the characters from their background. However, due to the affecting parameters described above the images obtained from various cameras may suffer from low differentiation. Accordingly, it can be advantageous to enhance the contrast of such characters. Various OCR technologies do so via techniques such as histogram modification, however the input quality can a limiting factor that drives the overall results to lower recognition rates and prevents repeatability of the results. Other optical contrast enhancement techniques can also be employed, such as illuminating the license plate with a narrow spectrum, for example near-infrared (near-IR), which is different from the color of the characters and/or the background. Additionally or alternatively, it is possible to use an optical band pass filter in the optical path between the camera and the license plate in order to filter out light in other spectrums. The resulting image is expected to have higher character contrast, which may improve the OCR results.

Many LPR systems use near-IR spectrum as their preferred spectrum, since the driver cannot see this bandwidth and thus, a high level of illumination may be used without affecting the driver. Example spectrums include, e.g., 850 nM, 880 nM or 950 nM. These spectrums' range (near infrared or "near-IR") is also effective in outdoor installations. However, in some places, such as Massachusetts (in United States) or Belgium (in Europe), license plates make use of red color, either for the license plate background or for the characters. For such plates, the use of near-IR spectrum results in a low contrast, since the background of the plate is illuminated with the same color of the characters (or opposite: the characters are illuminated with the background color). Therefore, LPR systems for such plates may require a different spectrum, e.g., in the visible range, such as yellow (e.g., 590 nM), which results in improved contrast.

Furthermore, in many cases different license plates exist in the same place and on the same time. Hence, many LPR installations have to cope with such mixed-plates situation, e.g., by having a stereo system using dual spectrums—such as a combination of near-IR and visible color. Each spectrum provides a respective image while it is possible to select the best image out of multiple spectrums. Such LPR systems use two cameras—one with near-IR filter and illumination, and the other with a visible color such as yellow.

In the stereo systems, each camera is often used for capturing multiple images, each image is captured using a different illumination level, wherein one image is selected out of the series of images, and the confidence of the reported result is determined based on the repetition and quality of the recognitions.

Another feature of the presently existing stereo-systems using dual spectrum solution is to allow video motion detection (VMD) to operate in covert IR mode, wherein firing the visible illumination is done a brief moment after the vehicle is detected.

It is noted that though the present description refers to license plates using alphanumeric characters, it should be understood that the technologies described herein can be similarly applied to identify/recognize practically any type of signs, symbol, etc., In other implementations, in addition to and/or in lieu of utilizing the referenced techniques (e.g., capturing images having different illumination levels), multiple image/video capture modes can also be utilized, such as with respect to a single camera. In doing so, one or more images can be captured with respect to a first set of capture parameters/settings, while one or more other images can be captured with respect to another set of capture parameters/settings, as described herein. The various captured images can then be analyzed to identify one or more characters, etc., and the results can be compared and/or combined, as described herein.

Moreover, in certain implementations the LPR application can also use different functions or processing parameters for different images (e.g., images captured under different capture parameters), thereby improving and/or optimizing the processing of each respective image. One example of such a function/processing is video motion detection (VMD), whereby the image capture settings/parameters as well as the image processing settings/parameters can be optimized for motion detection (which may entail different settings than, say, for LPR). By way of further example, image capture settings/parameters and image processing settings/parameters can be optimized with respect to capturing/identifying an overview image of the vehicle (which also may entail different settings than, say, for LPR). In doing so, in lieu of optimizing a particular camera with settings directed to LPR, the technologies described herein can support multiple optimizations for other functions, while utilizing a single camera. Moreover, this synergism can increase the overall capability of the system, increase its dynamic range, and can reduce the number of cameras necessary to perform a particular job.

It can be appreciated that while post-processing an image (e.g., after it has been captured) can enable the image to be manipulated in various ways, e.g., using multiple filters, histogram manipulations, etc., there are several advantages to controlling the capture of the image, e.g., at the sensor level, in order to yield different images. For example, the exposure time of multiple images can be alternated, such as between a low and high shutter-speed. In doing so, respective brighter and darker images are captured. It can be appreciated that the variation of the exposure time can generally only be achieved at the sensor level, as post-processing cannot achieve equivalent results without side effects such as increase of noise due to changes in the gain. By way of further example, in certain scenarios wide dynamic range (WDR) can be used in order to read both reflective and non-reflective plates. Utilizing the technologies described herein, a single camera can capture and provide two sets of images—e.g., one normal image with eight most significant bits out of the 12 bit resolution of the image, and the second image can use the 8 least significant bits.

Figure 1:
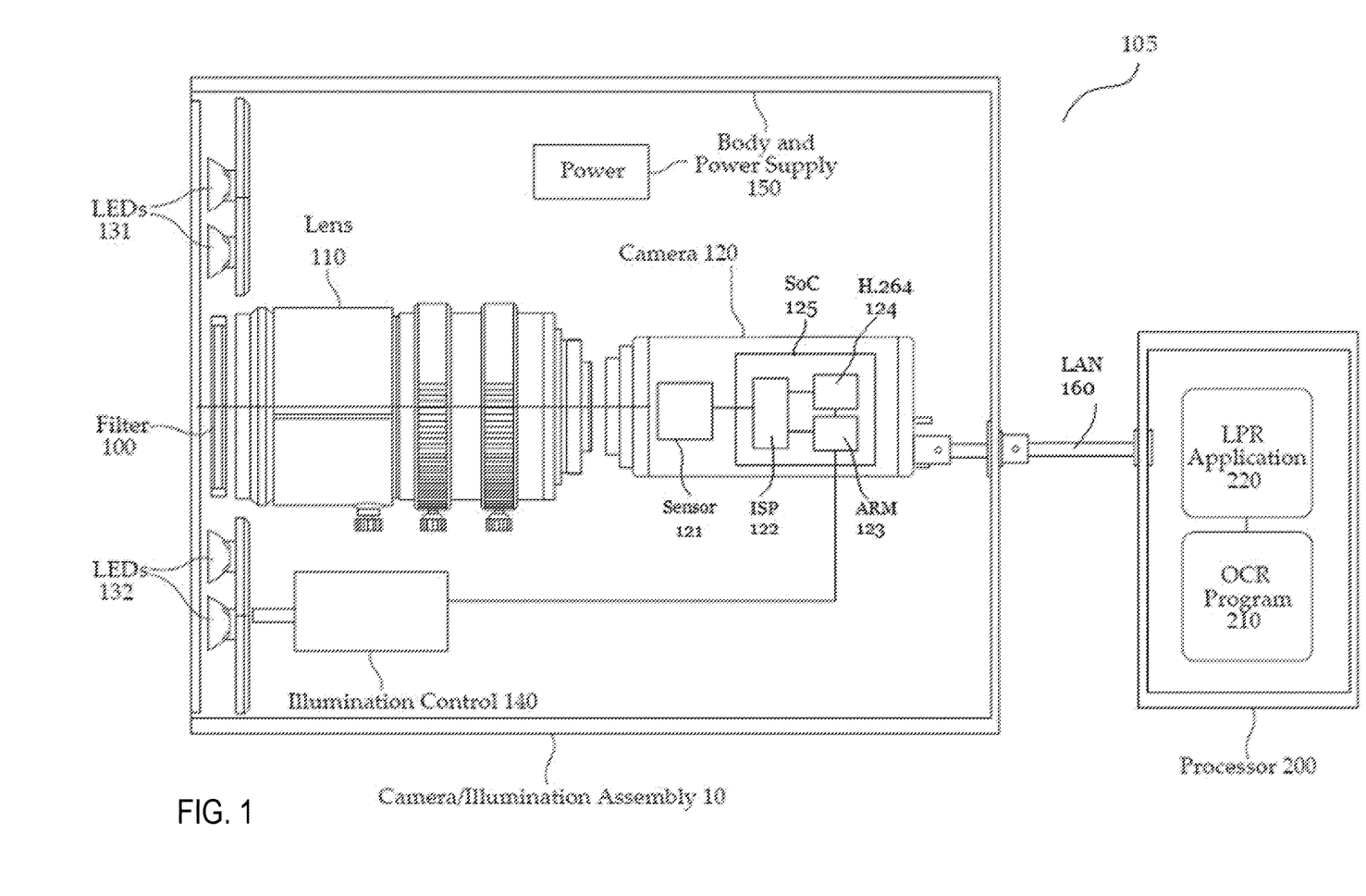
FIG. 1 depicts an illustrative system architecture, in accordance with aspects and implementations of the present disclosure.

FIG. 1 depicts an exemplary system 105, such as an LPR system, according to one implementation described herein. The system can include a camera/illumination assembly 10, within which various other components (such as those described herein) can be incorporated/housed.

As depicted in FIG. 1, system 105 can incorporate various components, including but not limited to:

Filter 100, which can be, for example, a single dual band-pass filter, through which various spectrums can pass, e.g., yellow and near-IR. Filter 100 can be mounted over lens 110 and/or be controlled by the camera to switch it in and out of the field of view of the sensor 121. The filter can be configured to pass various narrow bands of wavelengths. In one implementation, the filter can be oriented in front of the lens. It may include an anti-reflective coating to reduce ghost affects and glare.

Figure 2:
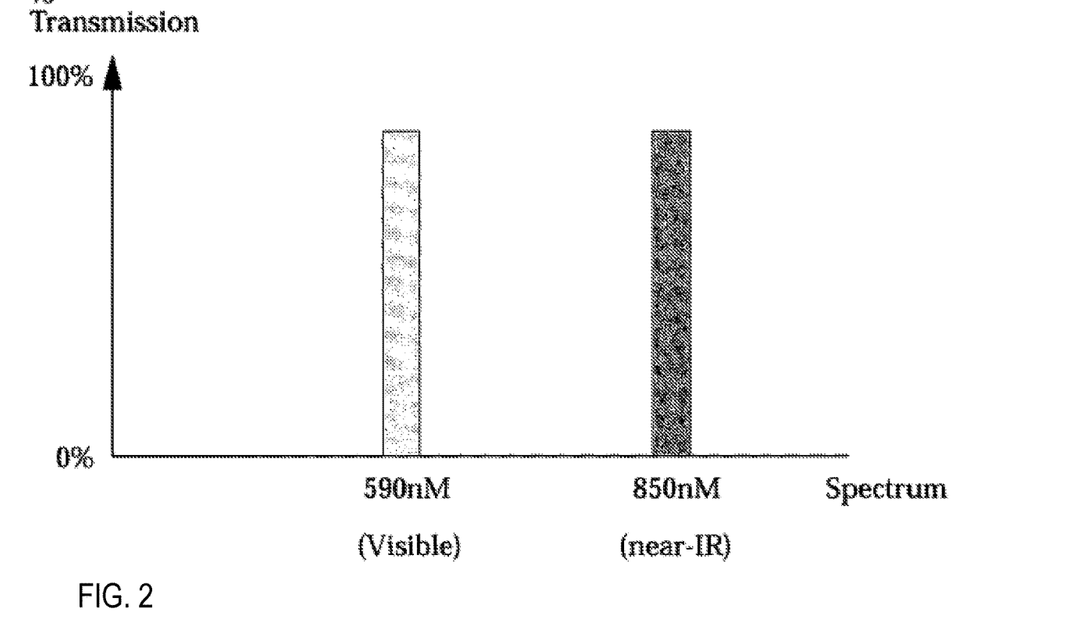
FIG. 2 illustrates percent transmission of a filter in accordance with aspects and implementations of the present disclosure.

FIG. 2 illustrates percent transmission of a filter. The bands selected for this filter are 590 nm (yellow) and 850 nm (near-IR), though it should be understood that these values are exemplary. The depicted bands are relatively narrow, with a 10 nm center width. These narrow bands are configured to allow through a relatively small amount of light, e.g., illumination that matches the spectrum provided by the illumination unit(s). The resulting image may be substantially black for most of the image, except for the plate and other reflective surfaces on the front or rear of the vehicle.

Other implementations, may, for example, utilize a triple (or more) band-pass filter. The third band may, for example, be at the lower end of the visible spectrum (e.g., 440 nm). This can be useful, for example, in order to determine the color of the body of the vehicle and/or plate using 3 values (e.g., Red, Green and Blue or RGB).

Lens 110 which can have, for example, a manual Iris, IR (infra-red) corrected. In certain implementations, in order to prevent a focus change between the visible and near-IR spectrums, a day-night lens (aka "IR lens") can be used. Such a lens can maintain a clear, sharp image in both spectrums. The lens may have a fixed focal length or a variable focal length (such as with a varifocal lens), and a manual Iris. The filter can be attached to the lens on the front side using its thread or a mounting bracket. The setting of the aperture may be set to medium position between maximal "open" (in order to reduce the required power of the illumination) and maximal "close" (i.e., minimal opening, to obtain a better depth of field). In other implementations, the iris of lens 110 can be automatically controlled (known as DC-IRIS), such as by commands provided by camera 120.

Various implementations can be configured for using visible and near-IR illumination as the predetermined narrow band spectrum ranges, though it should be understood that alternative spectrum ranges can also be used. In such implementations, such as those in which other spectrum ranges are utilized, the lens in use should be configured for such spectrum ranges.

Camera 120 (e.g., analog and/or digital) which can capture images, video, etc. Camera 120 can be either an analog or digital camera, provided that it operates in both visible and near-IR spectrums as most CCTV cameras do. The camera can also be configured to compress the images, stream the images over the network, and/or control the illumination. The camera can capture images off of sensor 121, controls the operation of the sensor 121, compress the image files, stream the images over the network 160, and/or control the illumination control 140.

Sensor 121 can be an image sensing device of the camera that converts light into electrons, such as a charge-coupled device (CCD) or complementary metal-oxide-semiconductor (CMOS). The various modes of operation of the sensor can be controlled by ISP 122, as determined by the ARM 123 processor settings. The sensor settings can include exposure, sensitivity, gain, noise, backlight, etc.

System on Chip (SoC) 125 can incorporate various subcomponents such as ISP 122, ARM 123 and H.264 124.

Image Signal processor (ISP) 122 can perform various operations with respect to the image data received from the sensor 124. Examples of such operations include but are not limited to color conversion, autofocus, auto-exposure, auto-white balance, lens corrections, noise reduction, and sensor controller. In certain implementations ISP can be controlled by the ARM 123 processor. The resulting images can be transferred to the H.264 124 for compression.

ARM 123 can be a compact computer processor and can control the camera functions and components. ARM 123 can operate based on a reduced instruction set computing (RISC) architecture. The ARM processor can control various functions of the camera and related components, such as based on commands received from the LPR application 220 over the LAN 160. ARM 123 can also operate as a streamer, such as by pushing the video and status data over the LAN 160.

H.264 124 can perform the compression of the image, such as based on a video compression format such as the H.264/MPEG-4 Part 10 compression format, Advanced Video Coding (AVC), etc.

Light Emitting Diodes (LEDs) 131-132, which can be, for example, near-IR power LEDs (131) and yellow LEDs (132) and/or LEDs of practically any other color, wavelength, spectrum, etc. Such LEDs can be arranged around the camera, inside the camera body, and/or on an outside assembly. In certain implementations a combination of near-IR LEDs 131 and yellow LEDs 132 that match the spectrum of the dual-band filter. These can be extra power LEDs that can use relatively few units to cover the full field of view of the scene homogenously. Their intensity can be selected at a sufficient level so that reflective plates will be almost washed out while using the high illumination level.

Illumination control module 140 which can control various levels of illumination intensity, such as in each spectrum (e.g., using the ARM subsystem in the camera). Each LED array 131-132 can be configured to provide constant, consistent and/or ongoing illumination, and/or to pulse in sync with the camera frame rate, and provide different illumination levels (for example, off/low/medium/high). The levels may be changed on field by the ARM 123 processor, in order to switch the illumination through various levels. Accordingly, it may be appreciated that the LEDs can be triggered to illuminate at a known illumination level, while the illumination, or light emission, is timed with camera operation for acquiring an image. In other implementations, near-IR LEDs 131 and visible light LEDs 132 may be fired in parallel, which can be useful, for example, in cases where high-speed traffic is involved. In certain implementations, the respective LEDs can be fired at different timings, such as in order to produce various images based on different spectrums.

Camera body and power supply 150 can further house and provide power to the various components.

Local area network (LAN) 160 can enable the connection of camera 120 to processor 200. In certain implementations, a communications protocol such as the RTP (Real-time Transport Protocol) interface protocol can be utilized for communication of images/video, commands and/or status exchange between a server (e.g., camera 120) and a client (e.g., processor 200). Moreover, in certain implementations a communications protocol such as RTSP (Real time streaming protocol) can be used for establishing and controlling media sessions between these two end points, including video control commands such as start/pause, etc.

Various components may be coupled to the camera/illumination assembly, such as: Processor 200 (e.g., an OCR processor) which can execute OCR program 210 and/or LPR application 220. The processor may be either inside the camera assembly (e.g., for a stand-alone all-in-one unit), on a detached processor, and/or in a remote network location (e.g., for networked cameras). Processor 200 interfaces with the camera via any number of interfaces (e.g., frame grabber, camera link, network, USB, etc.). Moreover, in certain implementations processor 200 can interface camera 120 using a communications protocol such as RTP (e.g., using a standardized packet format for delivering audio and video over IP networks). The processor can decompress the streamed video packets into images, and can group images into multiple types of images, such as based on different modes of the camera. The processor receives images captured by the camera 120/illumination unit(s), executes LPR application 220 and/or OCR program 210, and further conveys the results or reports thereabouts, such as is described herein.

OCR program 210 analyzes the captured/received images, and outputs a recognition result. The confidence level of the result can be based on a number of images obtained with respect to different spectrums, illumination levels, capture parameters/settings, etc.

LPR application 220 can control the detection of the events. It can, for example, configure various components to receive a detection signal from a sensor, determine the sequence of the illumination levels and/or the streamed video packets, control the decompression of the captured, capture the images/video in real time, activate the OCR program, and report the recognition result and its confidence level.

It should be understood that one or more functions of system 105 may be triggered at the moment a vehicle activates or deactivates an external hardware sensor, such as loop detector. In other implementations, image acquiring module, while having near-IR as one of the predetermined spectrum ranges, can be used for Video Motion Detection (VMD). In this case camera 120 can fire LEDs such as the near-IR LEDs 131 (e.g., a spectrum which is invisible) and processor 200 can check various images/frames for motion. When a vehicle steps into the field of view of the lens 110, the reflective plate of the vehicle can be detected by a change in the scene. Then the process of firing the visible spectrum illumination by LEDs 132 can be initiated. In doing so, both near-IR and visible spectrum images/videos are obtained. This arrangement can be advantageous in that the camera/illumination unit is otherwise invisible to the driver, and only a brief burst of a few fields may be observed.

It should be noted that the implementation illustrated in FIG. 1 is non-limiting and other alternatives are similarly contemplated. For example, in one such alternative implementation filter 100 may pass one or more other spectrums. In other implementations filter 100 may allow more/fewer intensity levels via illumination control module 140, use alternative and/or additional LED colors, etc. Furthermore, though near-IR and/or yellow illumination is referenced herein as by way of example, it should be appreciated that in various implementations any number of narrow band spectrum ranges can be added/substituted.

In various implementations, the technologies described herein can provide for reduced costs, as far fewer components than may be required by multi-camera systems are required. Additionally, there is no need to switch between multiple cameras, nor a need to mechanically calibrate multiple cameras.

Figure 3:
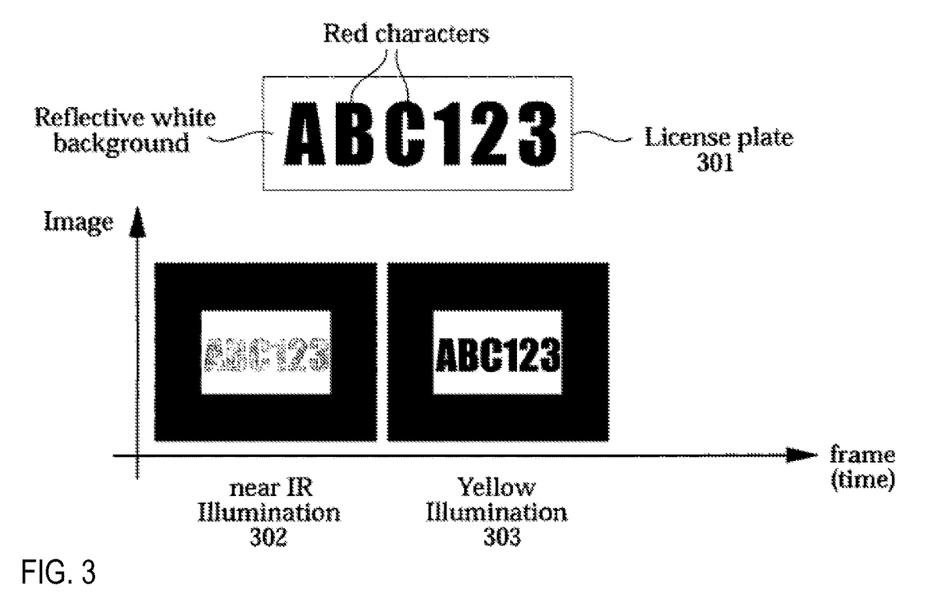
FIG. 3 depicts an exemplary scenario in which illumination is projected at a license plate, in accordance with aspects and implementations of the present disclosure.

According to one implementation, an exemplary process flow for an event of a vehicle activating a hardware detector is described. Following this trigger event, processor 200 initiates a sequence of image/video captures. An illustrated example is seen in FIG. 3 with a red-on-white-reflective plate 301 with two illumination and capture fields: 302 (near-IR illumination) and 303 (yellow illumination).

In field 302, for example, the near-IR LEDS 131 are activated. The light illuminates the front of the vehicle, including its reflective plate. The illuminated scene is recorded by the camera 120, after passing the filter 100 and the lens 110. Since the band pass filter may block all light except for its dual band, only the reflective surfaces will be visible on the camera, while the rest of the image will appear dark. After the camera 120 registers the image 302, it is conveyed to the processor 200. There, application 220 obtains the image digital data and an OCR process can be performed to generate a plate recognition result.

In field 303, visible (yellow) Light LEDs 132 can be pulsed. The process of image registration can repeat, but in this case the recorded image 303 can be based on the visible spectrum which can match the band-pass spectrum of filter 100. In the example of FIG. 3, this field provides the best contrast image 302 for the red-on-reflective white plate.

After capturing/receiving several images of either near-IR or visible (yellow) spectrum, the best image(s) can be determined based on the quality of the recognition result. Since the series is performed on both spectrums, it can be appreciated that one of the spectrums may yield contrast which is better than the contrast obtained with the other spectrum. For example, in monochromatic images acquired from a red-on-white plate (e.g., plate 301 in FIG. 3) the yellow illumination field 303 is likely to yield better contrast (as shown), when compared to the image acquired with near-IR illumination conditions. It can be appreciated that in colored images, with near-IR illumination, the license plate's characters are likely to appear almost red, while the background would appear pink. In a monochromatic image, on the other hand, the background is likely to appear almost white while the characters appear in light grey. That is, monochromatic images of license plate 301, obtained under near-IR illumination are characterized by poor contrast. On the other hand, when illuminating with yellow emitted light and acquiring a monochromatic image, the background color appears almost white, while the characters appear dark grey. Accordingly, in monochromatic images taken of a license plate having red-characters on reflective white background, yellow illumination provides higher contrast compared to an image obtained in near-IR illumination conditions. However, this is not always the case. For example, in case of a black-on-white-reflective plate, near-IR illumination may provide better results as compared to yellow illumination.

In certain implementations, in order to acquire images of license plates of a car, light is emitted, e.g., from LEDs 131 and 132, in order to generate a reflection from the license plates (and capture a corresponding image/video). The light that is emitted can be referred to as "emitted light", while the light reflected by the car/plate can be referred to as "reflected light."

The emitted light can be illumination in various predetermined spectrum ranges, though it is not necessary to emit the light of different ranges at the same time. For example, certain implementations may emit light ("first light emission") in a certain range ("first predetermined spectrum range", or "first range") and acquire an image/video ("first image"), and then emit second light emission in another range ("second predetermined spectrum range", or "second range") and acquire a second image/video. Alternative implementations may emit the multiple predetermined spectrum ranges simultaneously and acquire one image/video, while still other implementations may use a combination and, for example, emit light in two different ranges simultaneously while capturing a first image and then emit light in a single, third range for acquiring a second image/video, etc.

It should be appreciated that, in certain implementations, the photosensor in the camera should be sensitive to the spectrum of the reflected light. Accordingly, it should be sensitive to the multiple predetermined spectrum ranges of the emitted light.

Prior to reaching the camera and/or photosensor, in certain implementations the reflected light is filtered so as to allow only wavelengths of the referenced multiple predetermined spectrum ranges to reach a sensor of a camera. The light can penetrate the filter and pass therethrough, and such light is referred to herein as "filtered light". That is, the filtered light can be in the multiple predetermined spectrum ranges or there will be no filtered light, while in those cases when there is no filtered light, the camera will acquire an image having no details or almost no details inside, e.g., a poor contrast image.

When the filtered light reaches the camera and the photosensor, an image/video can be acquired/captured. According to one implementation, wherein light of different predetermined ranges is emitted serially, that is, one color is emitted at a time, at least one image/video can be acquired for each one of the multiple predetermined spectrum ranges of the emitted light. In other implementations images/video can be acquired/captured for more than one range of emitted light.

In certain implementations, the simultaneous or serial emission of light of the multiple predetermined spectrum ranges can be controlled/configured by the illumination control board 140. The illumination control board may also control how images/video are acquired, such as whether at least one image is acquired for each one of the multiple predetermined spectrum ranges of the emitted light or whether an image is acquired for more than one range of emitted light.

In some implementations a combination is allowed as well. For example, during daylight when emitting light the emitted light may simultaneously include light of multiple predetermined spectrum ranges, while in the evening and night, when background light become dimmed, it is possible to serially emit light of the different ranges. Accordingly, in certain implementations the image acquisition/capture may be controlled as well. For example, one or more images can be acquired for each one of the multiple predetermined spectrum ranges of the emitted light, while in other scenarios it is possible to acquire images for more than one range of emitted light.

It can be appreciated that in an LPR (License Plate Recognition) system, images can be processed, e.g., by an OCR (Optical Character Recognition) processor, in order to extract alphanumeric characters such as those that may compose a registration string. The processor may obtain/receive images from the LPR system's camera using any applicable means, such as via an interface board, which may be a frame grabber, network interface, camera link, USB, and/or any other interface. In certain implementations, it may also receive/obtain images stored in a storage device (such as disk or flash memory), thereby enabling batch OCR processing. The processor then analyzes the information relating to the license plate and extracts the registration string.

In certain implementations, the technologies described herein can be configured to capture and/or process multiple video and/or image streams with respect to different modes, parameters, etc. (e.g., capture parameters/settings, processing parameters/settings, etc.). For example, each stream can be processed using processing parameters that are configured/optimized with respect to the capture parameters with respect to which it was captured. By way of illustration, an LPR function may require capture parameters including a short exposure with low gain (e.g., in order to ensure a high recognition rate), while an overview function may require capture parameters including a long exposure and high gain (e.g., in order to obtain improved imagery in low light conditions). Accordingly, in lieu of using multiple cameras to capture images/videos based on different capture settings, the technologies described herein can capture, with a single camera, images under different sets of capture parameters/settings, and process such images with different sets of processing settings/parameters.

It can be appreciated that, in light of being captured under different sets of capture parameters/settings, different sets of images/video will reflect differences in various parameters, such as exposure, gain, focus settings, scale of the total resolution range of the sensor, region of interest, backlight settings, spectrum of the LEDs, and/or other parameters, each of which can be configured/optimized with respect to different processing functions/parameters. Each set can be configured to be transmitted in a different H.264 stream. In certain implementations, each stream (e.g., each set of images/video) can be equal in quantity, such as where two streams are transmitted at half the frame rate that the camera is able to achieve (e.g., a 60 HZ frame rate camera can be made up of two streams, one 30 hz stream captured with capture parameters optimized for LPR and processed with processing parameters optimized for LPR, and another 30 hz stream captured with capture parameters optimized for capturing overview images and processed with processing parameters optimized for overview images). In other implementations, the rate of the streaming can be configured to satisfy non-equal rates, such as three times more LPR images than one overview image. Additionally, in certain implementations this rate can be configured via ARM 123 by RTSP commands sent from processor 120.

In certain implementations, LPR application 220 can initialize camera 120 by sending commands over LAN 160 using the RTSP protocol. Such command(s) can configure the camera to configure/adjust multiple sets of settings of the sensor 121, lens 110, illumination control 140, ISP 122 and/or H.264 124.

Camera 120 can then illuminate a scene/region via illumination control 140, as configured during the initialization phase. The light reflected back from the scene can be registered on sensor 121, processed by ISP 122, compressed by H.264 and/or transmitted by ARM 123 over LAN 160 to processor 200 as one or more streams having the predefined streaming configuration (e.g., as captured based on the defined capture parameters and processed based on the defined processing parameters). The stream(s) may be viewed as live video and/or archived by the LPR application 220 in a video buffer.

In certain implementations, a detected/determined event can trigger one or more of the operations described herein. For example, the front of a passing vehicle can activate a hardware detector which can trigger processor 200 to initiate a sequence of image captures. LPR application 220 can initiate a sequence of image decompression out of one of the stream buffers that arrived before, during or after the triggering event. The decompression process may use the hardware graphical accelerator of processor 200, an addition processor board, and/or a software program. Application 220 can send the set of decompressed images, an OCR process can be performed, and a plate recognition result can be determined with respect to the received image(s).

In parallel to the referenced OCR capture/processing, another stream (e.g., another stream captured by the same camera, such as in the manner described herein) can be used for another function, such as an overview image (e.g., an image that provides an overview of a scene/region). LPR application 220 can perform a decompression process on the set of images, which were captured at a different optical setting (e.g., a setting optimized for overview images). The resulting overview image is thus optimized (and can be processed accordingly), and is not otherwise subjected to various settings (e.g., LPR settings) with respect to which the other stream was capture/processed.

Another example of a function for which various capture parameters/settings and/or processing parameters/settings can be configured is Vehicle Motion detection (VMD), for which various settings can be configured/optimized. For example, VMD capture and/or processing settings can be optimized with respect to a smaller region of interest (ROI) at the bottom of the field of view (e.g., for rear view capture). A stream configured with such settings is likely to be relatively faster to analyze/process (e.g., as compared with other capture/processing settings).

Another example of a function for which various capture parameters/settings and/or processing parameters/settings can be configured is Vehicle Identity Recognition (VIR), which can include the make, model, car body color and/or other attributes, such as are described in U.S. Pat. No. 8,577,088 which is incorporated herein by reference in its entirety. These, and other image based functions, may be optimized with different camera settings using the single camera with multiple streams.

The resulting system enables a synergized operation of multiple capture/processing functions, each of which can be optimized separately, and which can be achieved using a single camera.

Figure 4:
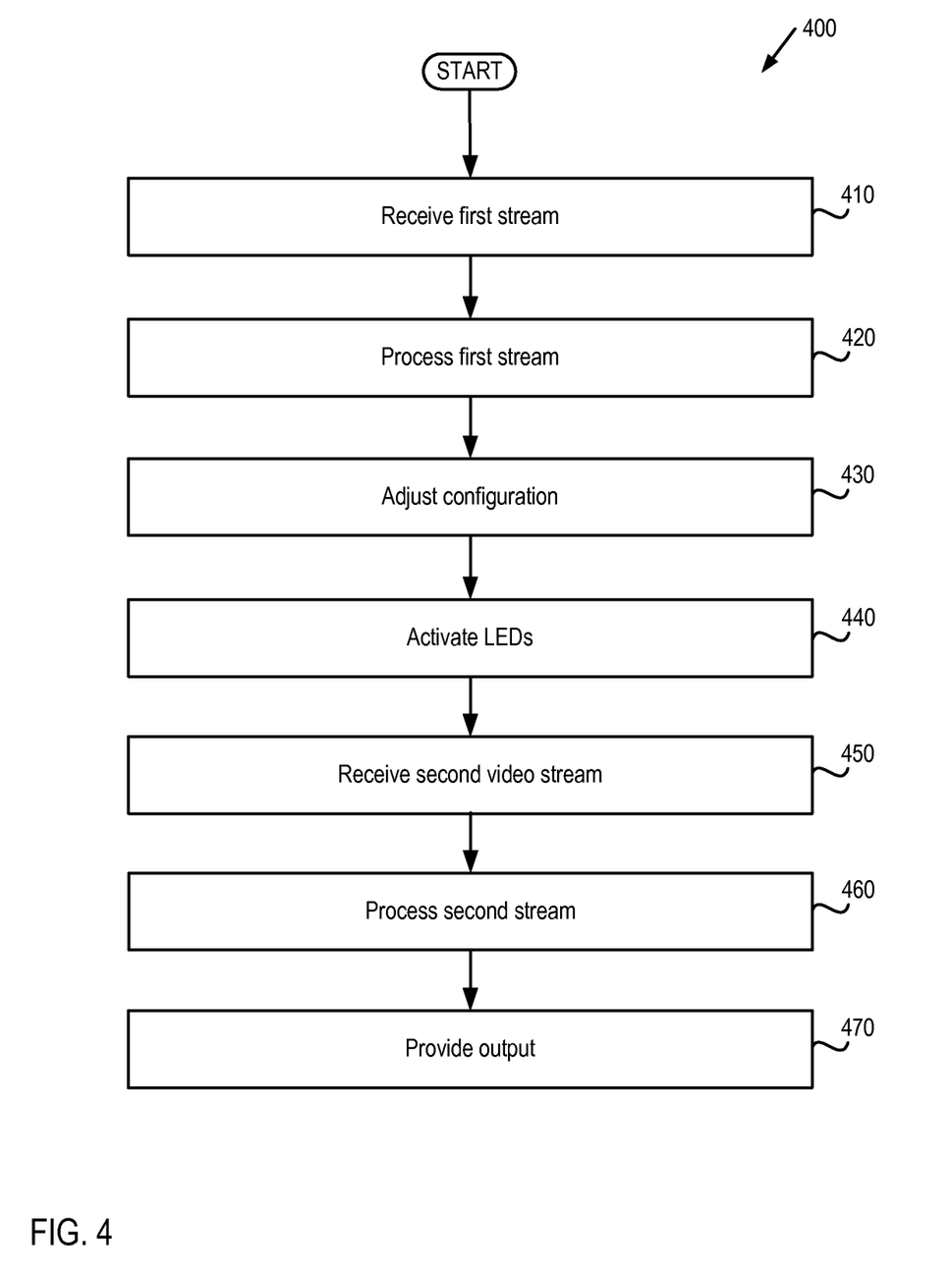
FIG. 4 depicts a flow diagram of aspects of a method for dynamic image capture and processing in accordance with aspects and implementations of the present disclosure.

FIG. 4 depicts a flow diagram of aspects of a method 400 for dynamic image capture and processing. The method is performed by processing logic that may comprise hardware (circuitry, dedicated logic, etc.), software (such as is run on a general purpose computer system or a dedicated machine), or a combination of both. In one implementation, the method is performed by one or more components of system 105 of FIG. 1 (e.g., processor 200), while in some other implementations, one or more blocks of FIG. 4 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 410, a first video stream can be received. Such a video stream can be, for example, a set of video frames, images, etc. (whether captured sequentially and/or at any other interval). In certain implementations, such a video stream can be captured via an optical sensor that is configured with a first set of capture parameters. Such capture parameters can be one or more settings, configurations, etc. (e.g., contrast, exposure time, focus, etc.) that can configure a camera/sensor to capture video/images in a particular way. Examples of such a set of capture parameters include but are not limited to a set of motion detection capture parameters (e.g., a set of parameters, such as exposure time, contrast, focus, etc., that can be configured or optimized to produce images that are optimal for motion detection processing). In one aspect, block 410 is performed by processor 200.

At block 420, a first video stream (e.g., the video stream received at block 410) can be processed. In certain implementations, such a video stream can be processed with/in relation to a first set of processing parameters. Such processing parameters can be, for example, various configurations, settings, etc., with respect to which one or more images can be processed in order to identify, determine, etc., a particular element, result, etc., within and/or with respect to the image(s). For example, in certain implementations, such processing parameters can include a set of motion detection parameters, which can be used to process a received video stream in order to detect the presence of motion (e.g., a vehicle passing through the field of vision of the camera). In one aspect, block 420 is performed by processor 200.

By way of illustration, a video stream can be processed with a set of processing parameters to identify a presence of one or more elements within the video stream, such as the presence of a vehicle (e.g., as opposed to other objects such as people). By way of further illustration, a video stream can be processing with a set of processing parameters to detect an incidence of motion within the video stream.

At block 430, a configuration of an optical sensor can be adjusted. In certain implementations, such a configuration of an optical sensor can be adjusted based on an identification of the presence of the one or more elements within a video stream (e.g., the video stream received at block 410). That is, it can be appreciated that a camera and/or system can be configured (e.g., by default) to observe a particular location and to detect the presence of motion within the field of vision of the camera. It can be further appreciated that various image capture settings and/or processing settings can configure the camera/system to capture and process such images in an optimal way (e.g., by capturing images in a way that is likely to provide as clear an indication of the presence of motion within the referenced field of view). However, upon identifying/determining the presence of motion within the referenced field of vision, it may be advantageous of adjust various aspects of the image capture/processing, such as in order to identify/determine other aspects/details within the field of vision of the camera (e.g., details of the license plate of a passing vehicle, etc.). As such, upon detecting the presence of motion (and/or based on any other such stimulus, trigger, etc.), the configuration/operation of the camera/system can be adjusted, such as by changing the focus, contrast, etc., of the camera. In doing so, images/video can be captured based on such (adjusted) settings and processed accordingly, as described herein. In one aspect, block 430 is performed by processor 200.

At block 440, one or more Light Emitting Diodes (LEDs) can be activated. In certain implementations, such LEDs can be activated to emit light within a first spectrum range. That is, in addition to and/or in lieu of adjusting various settings/parameters associated with the camera/system (e.g., at block 430), various LEDs can be illuminated, pulsed, etc., based on one or more stimuli, triggers, etc., such as those that can be identified with respect to the processing of one or more images, video streams, etc., such as at block 420. For example, in certain implementations, such LEDs can be activated to emit light (e.g., in a particular spectrum, such as is described herein) based on an identification of the presence of one or more elements within the first video stream (e.g., as identified/determined at block 420). In one aspect, block 440 is performed by processor 200.

At block 450, a second video stream can be received. Such a video stream can be captured via an optical sensor as configured with a second set of capture parameters (e.g., a set of parameters as adjusted at block 430). For example, in certain implementations, such a set of capture parameters can include a set of OCR capture parameters such as exposure time, contrast, focus, etc., that can be configured or optimized to produce images that are optimal for OCR processing (e.g., in an LPR system). In one aspect, block 450 is performed by processor 200.

At block 460, the second video stream (e.g., the video stream received at block 450) can be processed. In certain implementations, such a video stream can be processed with/in relation to a second set of processing parameters. Such a second set of processing parameters can include a set of OCR parameters (e.g., a set of processing parameters, functions, etc., that are configured to provide an optimal OCR result, such as an accurate identification of the characters/string(s) on a license plate). For example, the second video stream can be processed with/in relation to the second set of processing parameters to perform an optical character recognition (OCR) process in relation to the second video stream. In one aspect, block 460 is performed by processor 200.

In certain implementations, the second video stream can be processed with the second set of processing parameters based on an identification (e.g., at block 420) of the presence of the one or more elements within the first video stream. That is, as described herein, in certain implementations a video stream can be captured and/or processed for a particular function (e.g., motion detection) with respect to certain capture parameters/processing parameters, however, upon detecting/determining the presence of a particular element, stimulus, trigger, etc. (e.g., detecting motion within a particular scene, region, etc.), various aspects of such capture/processing can be adjusted. In doing so, the capture of subsequent images/video can be under conditions/parameters that are optimal for other determinations (e.g., to identify the characters on a license plate of a vehicle moving within the view of the camera). Moreover, the processing of such images/video can be performed with respect to parameters which are optimized with respect to such functions (e.g., OCR parameters/settings). In doing so, a single camera and processing system can be utilized to capture and process multiple video streams under different capture/processing settings that are optimized for each respective function (e.g., the identification of motion within a scene as well as the identification of the license plate number of a vehicle passing through).

At block 470 an output can be provided. Such an output can be provided based on the first video stream, as processed, and/or the second video stream, as processed. For example, an overview image (e.g., an image showing a vehicle within the field of vision of the camera) and/or an OCR result (e.g., the license plate number of the vehicle passing through the field of vision of the camera) can be provided (e.g., displayed on a display screen/device, provided as a notification, stored in a database, etc.). In one aspect, block 470 is performed by processor 200.

It should be noted that while various example capture parameters/settings and/or processing parameters/settings have been described herein, such as with respect to various functions with respect to which such images/videos can be captured and/or processed, such examples are non-limiting, and other capture parameters/settings and/or processing parameters/settings are similarly contemplated. By way of illustration, examples of various functions with respect to which images/videos can be captured and/or processed include but are not limited to: LPR, VMD, vehicle identity recognition (VIR), counting (e.g., a number of vehicles, etc.), speed calculation, number of passengers, facial recognition (e.g., of a face of a driver), Amber alerts, etc.

Figure 5:
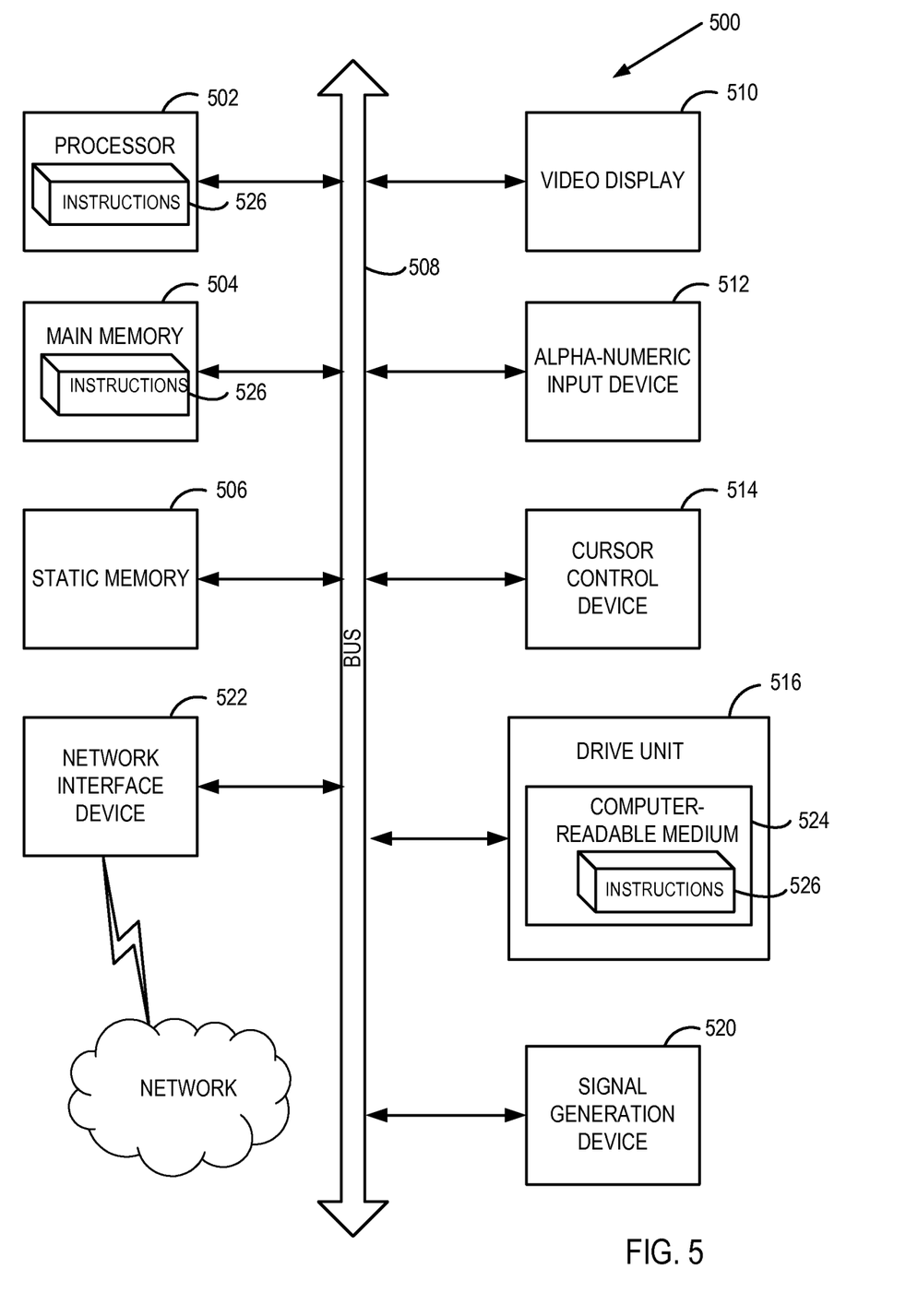
FIG. 5 depicts a block diagram of an illustrative computer system operating in accordance with aspects and implementations of the present disclosure.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions executed by collaboration manager 225, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "adjusting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, those described and/or referenced herein. The scope of the disclosure should, therefore, be determined with reference to the appended claims, along with the full scope of equivalents to which such claims are entitled.

What is claimed is:

1. A method, comprising:
   receiving a first set of images from a video stream, the first set of images from the video stream being captured via an optical sensor configured with a set of capture parameters associated with a first determination;
   processing the first set of images from the video stream with a first set of processing parameters, the first set of processing parameters being configured in relation to the set of capture parameters;
   adjusting the set of capture parameters in view of the processing of the first video stream with the first set of processing parameters as configured in relation to the set of capture parameters and the first determination;
   based on an identification of a presence of one or more elements within the first set of images from the video stream, as identified based on the processing of the first set of images from the video stream with the first set of processing parameters, activating one or more Light Emitting Diodes (LEDs) configured with respect to the optical sensor to emit light within a first spectrum range;
   receiving a second set of images from the video stream, the second set of images from the video stream being captured while the one or more LEDs emit light within the first spectrum range and via the optical sensor as configured with the adjusted set of capture parameters;
   processing, by a processing device, the second set of images from the video stream with a second set of processing parameters, the second set of processing parameters being configured in relation to the adjusted set of capture parameters; and
   providing an output based on at least one of (a) the first set of images from the video stream, as processed, or (b) the second set of images from the video stream, as processed.

2. The method of claim 1, wherein processing the first set of images from the video stream comprises processing the first set of images from the video stream with the first set of processing parameters to identify a presence of one or more elements within the first set of images from the video stream.

3. The method of claim 2, wherein processing the second set of images from the video stream comprises: based on an identification of the presence of the one or more elements within the first set of images from the video stream, processing the second set of images from the video stream with the second set of processing parameters.

4. The method of claim 2, further comprising based on an identification of the presence of the one or more elements within the first set of images from the video stream, adjusting a configuration of the optical sensor.

5. The method of claim 2, further comprising based on an identification of the presence of the one or more elements within the first set of images from the video stream, activating one or more Light Emitting Diodes (LEDs) to emit light within a first spectrum range.

6. The method of claim 1, wherein processing the first set of images from the video stream comprises processing the first set of images from the video stream with the first set of processing parameters to detect an incidence of motion within the first set of images from the video stream.

7. The method of claim 6, wherein the first set of processing parameters comprises a set of motion detection parameters.

8. The method of claim 6, wherein the set of capture parameters comprises a set of motion detection capture parameters.

9. The method of claim 1, wherein processing the second set of images from the video stream comprises processing the second set of images from the video stream with the second set of processing parameters to perform at least one of:
   (a) an optical character recognition (OCR) process,
   (b) a license plate recognition (LPR) process,
   (c) a vehicle motion detection (VIVID) process,
   (d) a vehicle identity recognition (VIR) process,
   (e) counting a number of vehicles,
   (f) a speed calculation process,
   (g) counting a number of passengers,
   (h) a facial recognition process, or
   (i) an Amber alert identification process, in relation to the second set of images from the video stream.

10. The method of claim 9, wherein the second set of processing parameters comprises a set of parameters configured for at least one of
   (a) the OCR process,
   (b) the LPR process,
   (c) the VIVID process,
   (d) the VIR process,
   (e) counting a number of vehicles,
   (f) the speed calculation process,
   (g) counting a number of passengers,
   (h) the facial recognition process, or
   (i) the Amber alert identification process.

11. The method of claim 9, wherein the set of capture parameters as adjusted comprises a set of at least one of
   (a) a set of OCR capture parameters,
   (b) a set of LPR capture parameters,
   (c) a set of VIVID capture parameters,
   (d) a set of VIR capture parameters,
   (e) a set capture parameters for counting a number of vehicles,
   (f) a set of speed calculation capture parameters,
   (g) a set of capture parameters for counting a number of passengers,
   (h) a set of facial recognition capture parameters, or
   (i) a set of Amber alert identification capture parameters.

12. The method of claim 1, wherein the set of capture parameters comprises at least one of one or more camera sensor settings, one or more exposure settings, one or more gain settings, one or more focus settings, one or more resolution settings, one or more region of interest settings, or one or more backlight settings.

13. A system comprising:
   a memory; and
   a processing device, operatively coupled to the memory, to:
      receive a first set of images from a video stream, the first set of images from the video stream being captured via an optical sensor configured with a set of capture parameters associated with a first determination;
      process the first set of images from the video stream with a first set of processing parameters;
      adjust the set of capture parameters in view of a processing of the first set of images from the video stream with the first set of processing parameters;
      based on an identification of a presence of one or more elements within the first set of images from the video stream, as identified based on the processing of the first set of images from the video stream with the first set of processing parameters, activate one or more Light Emitting Diodes (LEDs) configured with respect to the optical sensor to emit light within a first spectrum range;
      receive a second set of images from the video stream, the second set of images from the video stream being captured while the one or more LEDs emit light within the first spectrum range and via the optical sensor as configured with the set of capture parameters as adjusted based on the processing of the first set of images from the video stream with the first set of processing parameters being configured in relation to a second set of processing parameters that is different than the first set of processing parameters as configured in relation to the set of capture parameters and the first determination;
      process the second set of images from the video stream with the second set of processing parameters configured in relation to the set of capture parameters with respect to which the first set of images from the video stream was captured; and
      provide an output based on at least one of (a) the first set of images from the video stream, as processed, or (b) the second set of images from the video stream, as processed.

14. The system of claim 13, wherein to process the first set of images from the video stream is to process the first set of images from the video stream with the first set of processing parameters to identify a presence of one or more elements within the first set of images from the video stream.

15. The system of claim 14, wherein to process the second set of images from the video stream is to process, based on an identification of the presence of the one or more elements within the first set of images from the video stream, the second set of images from the video stream with the second set of processing parameters.

16. The system of claim 14, wherein the processing device is further to adjust a configuration of the optical sensor based on an identification of the presence of the one or more elements within the first set of images from the video stream.

17. The system of claim 13, wherein to process the first video stream is to process the first set of images from the video stream with the first set of processing parameters to detect an incidence of motion within the first set of images from the video stream.

18. The system of claim 13, wherein to process the second set of images from the video stream is to process the second set of images from the video stream with the second set of processing parameters to perform at least one of
   (a) an optical character recognition (OCR) process,
   (b) a license plate recognition (LPR) process,
   (c) a vehicle motion detection (VIVID) process,
   (d) a vehicle identity recognition (VIR) process, (e) counting a number of vehicles,
(f) a speed calculation process,
(g) counting a number of passengers,
(h) a facial recognition process, or
(i) an Amber alert identification process in relation to the second set of images from the video stream.

19. The system of claim 18, wherein the second set of processing parameters comprises a set of parameters for at least one of
   (a) the OCR process,
   (b) the LPR process,
   (c) the VIVID process,
   (d) the VIR process,
   (e) counting a number of vehicles,
   (f) the speed calculation process,
   (g) counting a number of passengers,
   (h) the facial recognition process, or
   (i) the Amber alert identification process.

20. A non-transitory computer readable medium having instructions stored thereon that, when executed by a processor, cause the processor to:
   receive a first set of images from a video stream, the first set of images from the video stream being captured via an optical sensor configured with a set of capture parameters associated with a first determination;
   process the first set of images from the video stream with a first set of processing parameters, the first set of processing parameters being configured in relation to the set of capture parameters and the first determination;
   adjust the set of capture parameters with respect to a second determination in view of a processing of the first set of images from the video stream with the first set of processing parameters;
   based on an identification of a presence of one or more elements within the first set of images from the video stream, as identified based on the processing of the first set of images from the video stream with the first set of processing parameters, activate one or more Light Emitting Diodes (LEDs) configured with respect to the optical sensor to emit light within a first spectrum range;
   receive a second set of images from the video stream, the second set of images from the video stream being captured via the optical sensor while the one or more LEDs emit light within the first spectrum range and as configured with the set of capture parameters as adjusted with respect to the second determination based on the processing of the first set of images from the video stream with the first set of processing parameters, the set of capture parameters as adjusted based on the processing of the first set of images from the video stream with the first set of processing parameters being configured in relation to a second set of processing parameters that is different than the first set of processing parameters as configured in relation to the set of capture parameters and the first determination;
   process the second set of images from the video stream with the second set of processing parameters, the second set of processing parameters being configured in relation to the set of capture parameters with respect to which the first set of images from the video stream was captured as adjusted based on the processing of the first set of images from the video stream with the first set of processing parameters as configured in relation to the set of capture parameters and the first determination; and
   provide an output based on at least one of (a) the first set of images from the video stream, as processed, or (b) the second set of images from the video stream, as processed.

* * * * *